(12) United States Patent
Zatkin

(10) Patent No.: US 12,650,867 B2
(45) Date of Patent: Jun. 9, 2026

(54) TRANSPOSING VIRTUAL CONTENT BETWEEN COMPUTING ENVIRONMENTS

(71) Applicant: DataDNA, Inc., Surprise, AZ (US)

(72) Inventor: Geoffrey Zatkin, Surprise, AZ (US)

(73) Assignee: DataDNA, Inc., Surprise, AZ (US)

( * ) Notice: Subject to any disclaimer, the term of this patent is extended or adjusted under 35 U.S.C. 154(b) by 276 days.

(21) Appl. No.: 18/385,061

(22) Filed: Oct. 30, 2023

(65) Prior Publication Data

US 2024/0061696 A1 Feb. 22, 2024

Related U.S. Application Data

(63) Continuation-in-part of application No. 17/856,403, filed on Jul. 1, 2022, now Pat. No. 11,801,448.

(51) Int. Cl.
| | |
|---|---|
| *A63F 13/85* | (2014.01) |
| *G06F 9/455* | (2018.01) |
| *G06F 21/10* | (2013.01) |
| *A63F 13/537* | (2014.01) |

(52) U.S. Cl.
CPC .......... *G06F 9/45533* (2013.01); *A63F 13/85* (2014.09); *G06F 21/1085* (2023.08); *A63F 13/537* (2014.09)

(58) Field of Classification Search
CPC ........................... A63F 13/85; A63F 2300/575
See application file for complete search history.

(56) References Cited

U.S. PATENT DOCUMENTS

| | | | | |
|---|---|---|---|---|
| 6,119,229 A * | 9/2000 | Martinez | ................. | A63F 13/12 |
| | | | | 726/28 |
| 9,227,143 B2 * | 1/2016 | Yoda | ...................... | A63F 13/795 |
| 11,383,171 B1 * | 7/2022 | Stoyanov | ............. | G06Q 20/227 |
| 2002/0082065 A1 * | 6/2002 | Fogel | .................... | A63F 13/822 |
| | | | | 463/30 |
| 2007/0238499 A1 * | 10/2007 | Wright | .................... | A63F 13/12 |
| | | | | 463/1 |
| 2008/0045283 A1 * | 2/2008 | Stamper | .................. | A63F 13/58 |
| | | | | 463/1 |
| 2012/0088586 A1 * | 4/2012 | Watkins, Jr. | ............ | A63F 13/69 |
| | | | | 463/42 |

(Continued)

*Primary Examiner* — Jay Trent Liddle

(74) *Attorney, Agent, or Firm* — Wood Rogers PLC; Timothy Bechen

(57) ABSTRACT

A computerized method and processing system provides for transposing virtual content items between computing environments. The method and system includes receiving a transpose request to transpose a first item from the first computing environment to a second computing environment using intelligent transposition processing operations. including transpose rules relating to transposing the first item to the second computing environment and accessing environment data relating to the first computing environment and the second computing environment. The method and system includes determining a second item for utilization in the second computing environment, a virtual translation of the first item based on the transpose rules and the second computing environment data. The method and system includes transmitting an authorization command to the second computing environment to authorize utilization of the second item in the second computing environment.

20 Claims, 10 Drawing Sheets

FIG. 5E

(56) References Cited

U.S. PATENT DOCUMENTS

| | | | |
|---|---|---|---|
| 2013/0194278 A1* | 8/2013 | Zajac, III | A63F 13/12 |
| | | | 345/473 |
| 2014/0031127 A1* | 1/2014 | Westerberg | H04M 1/72427 |
| | | | 463/42 |
| 2014/0128165 A1* | 5/2014 | Ganz | H04L 65/403 |
| | | | 709/204 |
| 2014/0162765 A1* | 6/2014 | Bai | A63F 13/69 |
| | | | 463/25 |
| 2014/0342808 A1* | 11/2014 | Chowdhary | A63F 13/493 |
| | | | 463/24 |
| 2019/0015741 A1* | 1/2019 | Morishita | H04L 67/52 |

* cited by examiner

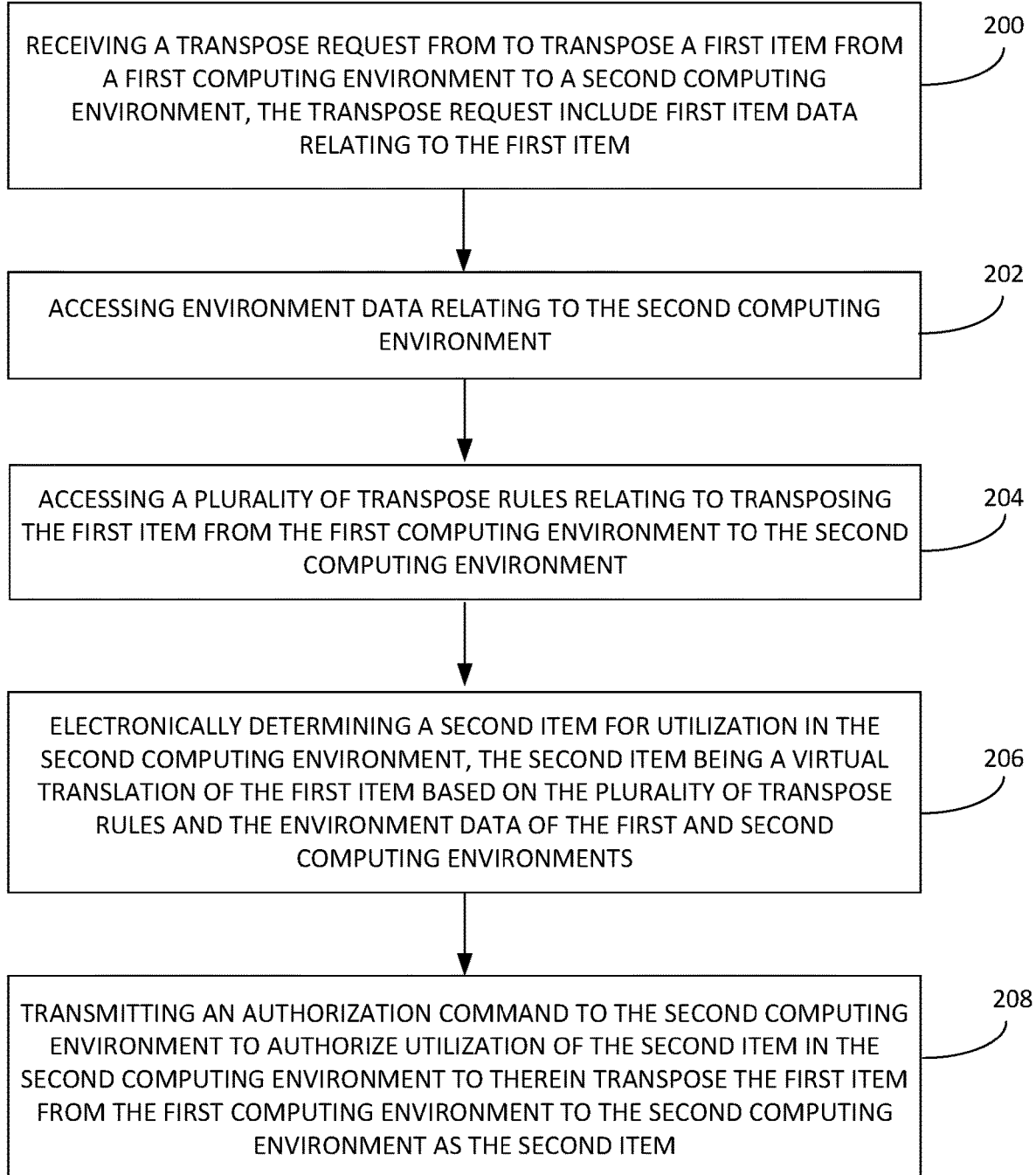

RECEIVING A TRANSPOSE REQUEST FROM TO TRANSPOSE A FIRST ITEM FROM A FIRST COMPUTING ENVIRONMENT TO A SECOND COMPUTING ENVIRONMENT, THE TRANSPOSE REQUEST INCLUDE FIRST ITEM DATA RELATING TO THE FIRST ITEM
200

ACCESSING ENVIRONMENT DATA RELATING TO THE SECOND COMPUTING ENVIRONMENT
202

ACCESSING A PLURALITY OF TRANSPOSE RULES RELATING TO TRANSPOSING THE FIRST ITEM FROM THE FIRST COMPUTING ENVIRONMENT TO THE SECOND COMPUTING ENVIRONMENT
204

ELECTRONICALLY DETERMINING A SECOND ITEM FOR UTILIZATION IN THE SECOND COMPUTING ENVIRONMENT, THE SECOND ITEM BEING A VIRTUAL TRANSLATION OF THE FIRST ITEM BASED ON THE PLURALITY OF TRANSPOSE RULES AND THE ENVIRONMENT DATA OF THE FIRST AND SECOND COMPUTING ENVIRONMENTS
206

TRANSMITTING AN AUTHORIZATION COMMAND TO THE SECOND COMPUTING ENVIRONMENT TO AUTHORIZE UTILIZATION OF THE SECOND ITEM IN THE SECOND COMPUTING ENVIRONMENT TO THEREIN TRANSPOSE THE FIRST ITEM FROM THE FIRST COMPUTING ENVIRONMENT TO THE SECOND COMPUTING ENVIRONMENT AS THE SECOND ITEM
208

FIG. 3

| FIRST CONTENT ITEM | |
|---|---|
| NAME: | PX450 LASER RIFLE |
| TYPE: | RANGED WEAPON [PROJECTILE] |
| CLASS: | RIFLE |
| POWER LEVEL: | STRONG |
| EQUIP STATUS: | HELD [TWO-HANDED] |
| RANGE: | LONG |
| ● ● ● | |
| SECONDARY COLOR: | BLUE |
| ENVIRONMENT METADATA: | FUTURE |
| ENVIRONMENT METADATA: | SCI-FI |

FIG. 4

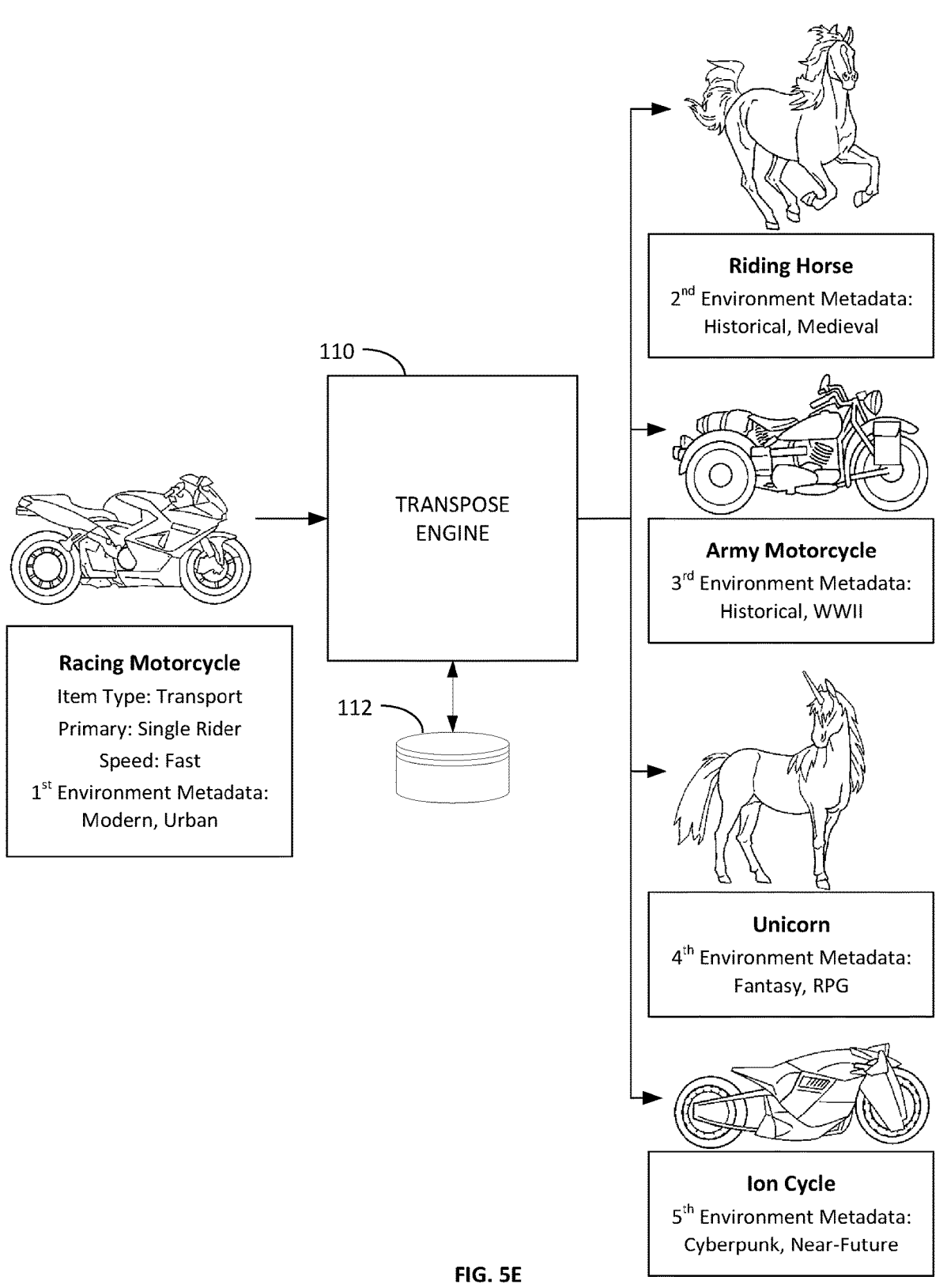

Riding Horse

2$^{nd}$ Environment Metadata:
Historical, Medieval

Army Motorcycle

3$^{rd}$ Environment Metadata:
Historical, WWII

Unicorn

4$^{th}$ Environment Metadata:
Fantasy, RPG

Ion Cycle

5$^{th}$ Environment Metadata:
Cyberpunk, Near-Future

110

TRANSPOSE
ENGINE

112

Racing Motorcycle

Item Type: Transport
Primary: Single Rider
Speed: Fast
1$^{st}$ Environment Metadata:
Modern, Urban

FIG. 5E

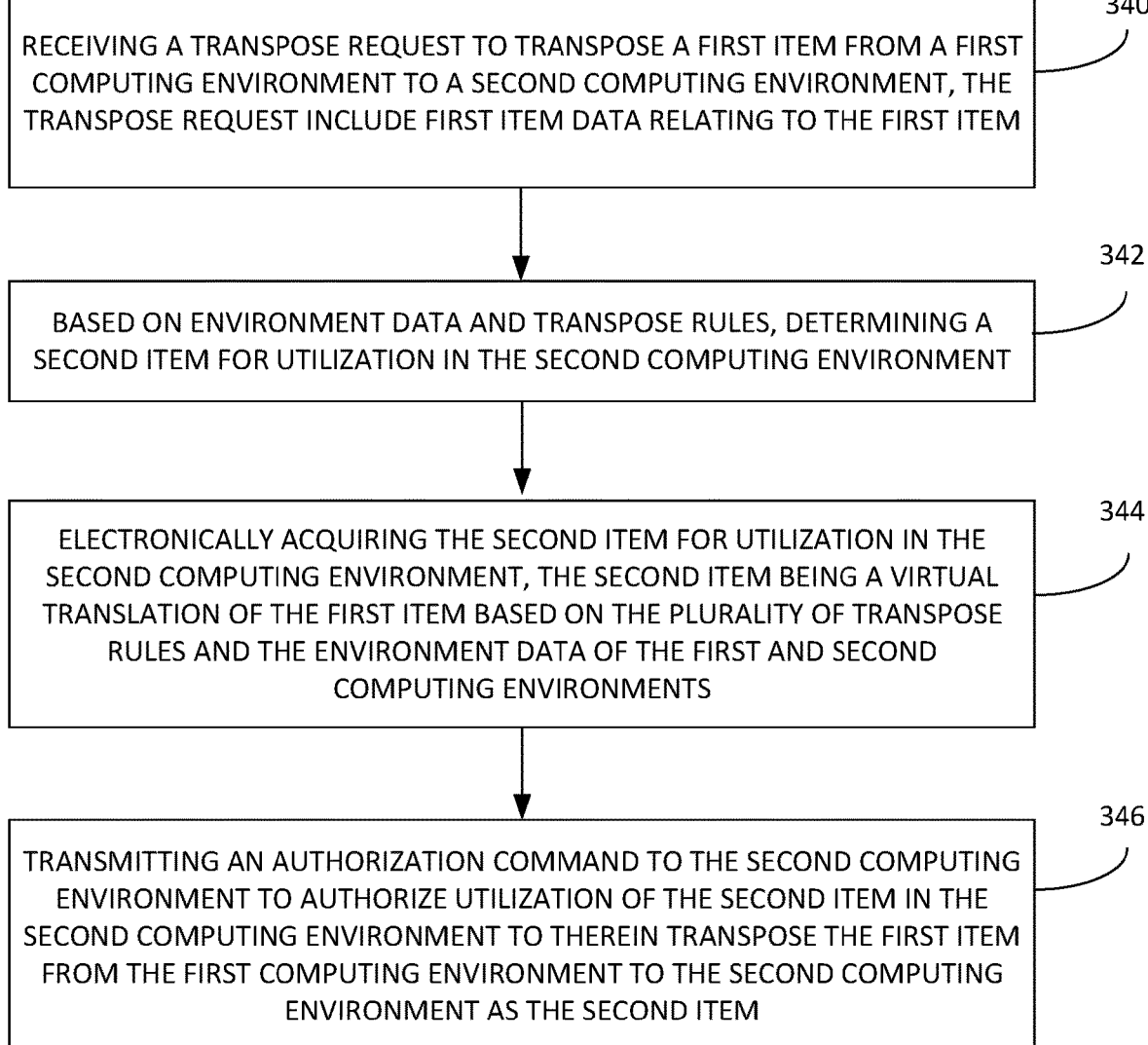

340

RECEIVING A TRANSPOSE REQUEST TO TRANSPOSE A FIRST ITEM FROM A FIRST COMPUTING ENVIRONMENT TO A SECOND COMPUTING ENVIRONMENT, THE TRANSPOSE REQUEST INCLUDE FIRST ITEM DATA RELATING TO THE FIRST ITEM

342

BASED ON ENVIRONMENT DATA AND TRANSPOSE RULES, DETERMINING A SECOND ITEM FOR UTILIZATION IN THE SECOND COMPUTING ENVIRONMENT

344

ELECTRONICALLY ACQUIRING THE SECOND ITEM FOR UTILIZATION IN THE SECOND COMPUTING ENVIRONMENT, THE SECOND ITEM BEING A VIRTUAL TRANSLATION OF THE FIRST ITEM BASED ON THE PLURALITY OF TRANSPOSE RULES AND THE ENVIRONMENT DATA OF THE FIRST AND SECOND COMPUTING ENVIRONMENTS

346

TRANSMITTING AN AUTHORIZATION COMMAND TO THE SECOND COMPUTING ENVIRONMENT TO AUTHORIZE UTILIZATION OF THE SECOND ITEM IN THE SECOND COMPUTING ENVIRONMENT TO THEREIN TRANSPOSE THE FIRST ITEM FROM THE FIRST COMPUTING ENVIRONMENT TO THE SECOND COMPUTING ENVIRONMENT AS THE SECOND ITEM

FIG. 7

TRANSPOSING VIRTUAL CONTENT BETWEEN COMPUTING ENVIRONMENTS

RELATED APPLICATIONS

The present application is a continuation-in-part of and claims priority to U.S. patent application Ser. No. 17/856, 403 entitled "TRANSPOSING VIRTUAL CONTENT BETWEEN COMPUTING ENVIRONMENTS," filed on Jul. 1, 2022, now issued U.S. Pat. No. 11,801,448.

COPYRIGHT NOTICE

FIELD OF THE INVENTION

The present invention relates to content management within computing environments and more specifically to transposing virtual item(s) between multiple computing environments.

BACKGROUND

With the continued growth of virtual worlds, online communities, and other virtual reality interactions, there is a growing demand for using online or virtual content in different computing environments.

Users create, earn, purchase, or otherwise acquire online content. This content can be extremely valuable. But the current siloed nature of virtual worlds and online communities means these items are stuck in the original environment.

Based on the user's investments in this content, there is a growing demand for portability of these virtual items between different computing environments. Many problems arise, including digital rights management issues, as well as portability of the item itself.

A virtual item in a first environment does not automatically translate or work in a second environment. For example, a first environment may be an online multiplayer game, the game being a futuristic military fighting campaign game. The user can own a specific weapon in the first environment game, e.g. a proton gun. The user also accesses a second environment, for example a middle-ages clan-based game. Based on the silo-ed nature of each environment, system designers and developers would look to restrict the user transporting the weapon from between the environments. For example, there are obvious thematic issues, not wanting a proton gun imported and used in a middle-ages clan-based game.

Currently, there are limited solutions for moving content between computing environments. For instance, U.S. Pat. No. 8,758,119 describes transferring a specific in-game asset between different players. This prior art solution is not about transporting the digital asset between environments, but rather sharing and having the same asset in two different games.

Another prior art technique is U.S. Publication No. 2021/0201591 describing a singular digital asset and how that asset is observable in the different environments. This approach does not transport or update an object or digital asset, but rather changes how the object is viewed based on the underlying immersive or augmented reality scene.

As such, there exists a need for processing solutions facilitating movement of online or virtual content across different environments, including accounting for the differences in these different environments.

BRIEF DESCRIPTION

The present invention is a computerized method and processing system for transposing virtual content items between computing environments. As used herein, computing environments are any immersive or complimentary processing/computing environments, including but not limited to augmented reality, virtual reality, gaming systems and platforms, online social environments and experiences, social media platforms, simulations, video games, virtual asset collections, virtual scholastic and training environments, virtual worlds, etc. The virtual content is any item or items with a virtual or computerized representation within the environment.

The present method and system includes transposing virtual content items using Intelligent Transposition processing operations. As used herein, Intelligent Transposition comprises the transposing of virtual content items at one or more computing stages, using at least one system comprised of artificial intelligence (AI), the application of data science solutions, or machine learning (ML), or any other computer-generated processing technique or methodology including but not limited to recursive processing techniques. The processing operations of Intelligent Transposition can be performed within one or more, local and/or networked, processing devices for performing operations as noted herein.

The method and system may additionally use Intelligent Asset Evaluation processing operations, which may be integrated within, complimentary to, or independent of the Intelligent Transposition operations. As used herein, Intelligent Asset Evaluation comprises the use of AI engine(s), ML engines, or any other suitable recursive processing environment(s), generally referred herein as AI, to review, capture, analyze, or otherwise learn from any representation of fictional or non-fictional activities such as literature, text, audio, video, music, photography, social media, websites, lectures, essays, recorded videogame gameplay, real-time events occurring in a real or virtual environment, etc., using AI systems (such as machine vision operations, natural language processing, etc.) to detect not only the representation and description of items, but also utilization features associated with the items. The Intelligent Asset Evaluation processing operations include learning or otherwise acquiring data points having direct and/or indirect relationship to Intelligent Transposition operations, for example including but not expressly limited to accessing historical print data regarding time periods, historical figures, historical culture, etc. In another example, learning can include accessing social media data regarding current news and events, or social, economic, gaming, information, or any other suitable data point(s) as recognized by a skilled artisan. In another example, Intelligent Asset Evaluation can review moving and still images to learn to recognize and correlate common objects. Evaluation can include accessing, reviewing and learning from any suitable data source, for example learning video game gameplay, literature, movies, pictures, illustrations, lectures and video essays, social media content, websites, etc. The above examples are general examples and not expressly limiting, whereby the functional operation of the Intelligent Asset Evaluation includes accessing, acquiring, processing, or otherwise utilizing any available data in any available format for improving learning model data sets for item transposition operations.

The method and system includes receiving a transpose request to transpose a first item from the first computing environment to a second computing environment, or a request from a second computing environment to transpose an item from the first. The transpose request includes, or returns, first item data, which is data that relates to the first item within the first computing environment. The data may include meta data describing the item, including features or uses of the item. The data may also include data relating to the first computing environment, including the type of environment, an environment genre, as well as other descriptors.

The method and system includes accessing one or more transpose rules, the rules relating to transposing the first item between computing environments. The transpose rules include instructions for analyzing the first item data, or determining transpose rules using Intelligent Transposition. The Intelligent Transposition can be performed using one or more of three possible embodiments. A first embodiment is using the transpose rules by themselves. A second embodiment is using the AI, ML, or other recursive processing operations to replace the transpose rules. A third embodiment is using the AI, ML, or other recursive processing operation to assist or rewrite the transpose rules.

The method and system includes accessing environment data relating to the second computing environment. The environment data includes data indicating information about the environment, including for example but not limited to the type of computing environment, an environment aesthetic, era, genre, setting or style, ownership or proprietary restrictions to the environment, etc. The environment data may also be determined using the Intelligent Asset Evaluation including data acquired or learning therefrom.

Based on transpose rules and the environment data of the first and second environments, the method and system includes electronically determining at least one second item for utilization in the second computing environment. This second item is a virtual translation of the first item, but in a form usable in the second environment. Herein, the virtual translation is at least one of three possible types: finding a correlating item from the second environment; modifying the item from the second environment; and creating the second item for the second environment.

Embodiments utilizing Intelligent Transposition processing operations and/or Intelligent Asset Evaluation processing operations can include functionality to assist with or wholly generate transposed items. Herein, the operational step of creating the second item can be executed using one or more AI engines to build one or more repositories of transpose items. In another embodiment, the operational step of creating the second item can be performed or modified using AI executable instructions for improving the accuracy or effectiveness of the second item for the second environment. In another embodiment, the operational step of creating the second item can be performed or modified by AI to supply information, code, or other data to represent the second item visually, audibly, or in textual form.

The method and system therein transmits an authorization command to the second computing environment to authorize utilization of the second item in the second computing environment. This authorization therein transposes the first item from the first computing environment into the second computing item as the second item.

Therein, the present method and system facilitates transposing virtual content items between different computing environments including accounting for content item details and computing environment factors.

Utilization of Intelligent Transposition and/or Intelligent Asset Evaluation processing operations can further include updating or refining the virtual transposing of content items and well as provide data feedback to learning models.

BRIEF DESCRIPTION OF THE DRAWINGS

FIG. 3 illustrates a flowchart of the steps of one embodiment of a method for transposing virtual items;

FIG. 4 illustrates sample data structures used for transposing virtual content items;

FIGS. 5A-5E illustrate graphical representation of exemplary embodiments of electronically determining a second item for transposing virtual items;

FIG. 7 illustrates a flowchart of the steps of one embodiment of a method for transposing virtual items using AI functionality.

A better understanding of the disclosed technology will be obtained from the following detailed description of the preferred embodiments taken in conjunction with the drawings and the attached claims.

DETAILED DESCRIPTION

Herein, the method and system allows a user to transpose a virtual item from a first environment to a second environment. As used herein, transpose differs from transporting, where transposing accounts for the specifics of the incoming computing environment. By way of example, a user may own a magical sword with unique powers in a fantasy-realm massive multi-player online game. The user switches games and joins a modern-day military campaign game with teams of online players competing in specific missions. The fantasy-realm magical sword does not fit into the military campaign game, therefore it would be incongruent to transport this item between games.

In this example, the method and system can translate the sword into a comparable item. For example, the sword can be translated as a machete, knife, or other slashing or stabbing item usable in the military campaign game.

Figure 1:
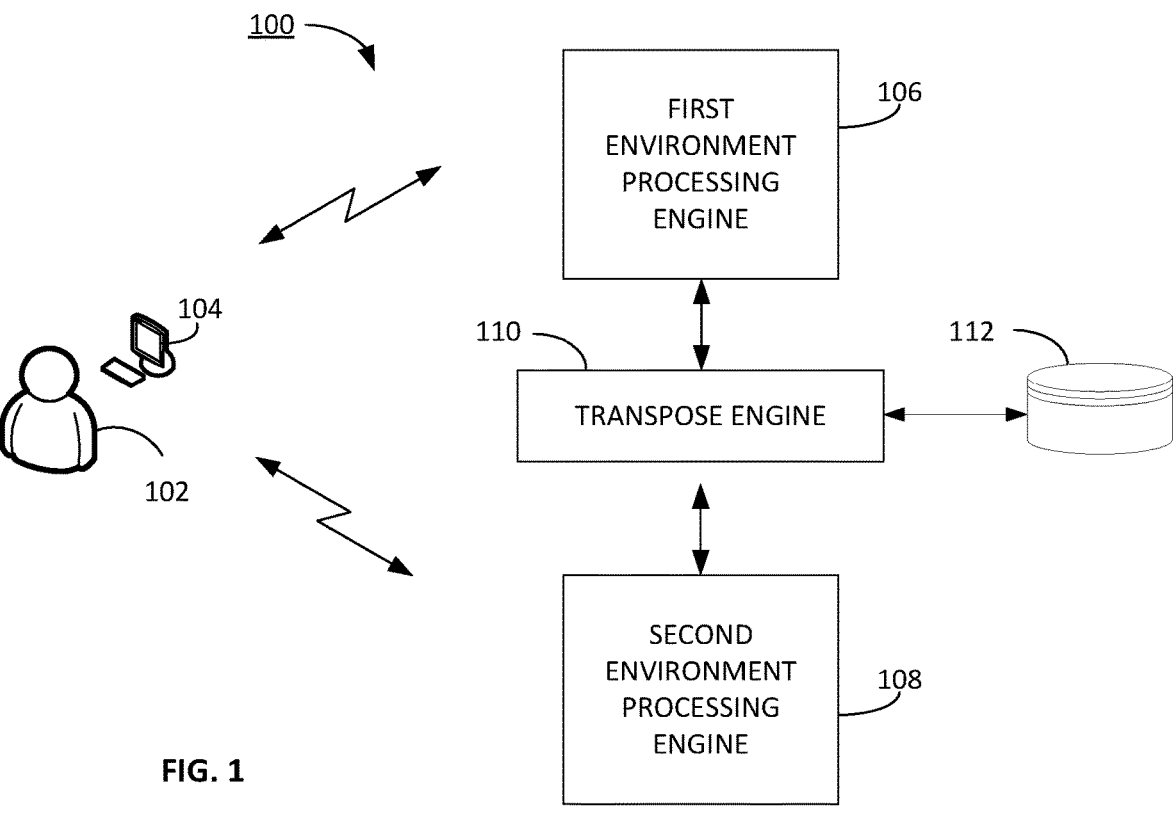
FIG. 1 illustrates one embodiment of a computing environment providing for transposing virtual content items.

FIG. 1 illustrates a processing system 100 whereby a user 102 can transpose virtual content items between computing environments. The system 100 includes the user 102, at least one computing device 104, a first environment processing engine 106, a second environment processing engine 108, a transpose engine 110 disposed therebetween, and at least one reference database 112.

The at least one computing device 104 can be one or more computing or processing devices facilitating connecting and engaging with computing environments. By way of example, but not expressly limiting, the computing device 104 can be a laptop computer, desktop computer, tablet computer, a gaming console, a mobile phone or other mobile device, virtual reality or augmented reality eyewear or headset, smart television, smart speaker, or any other suitable device as recognized by one skilled in the art.

The first environment processing engine 106 and the second environment processing engine 108 can be any suitable processing device or devices providing for an online, computerized, immersive, and/or otherwise engaging gaming or interactive experience for the user 102 via the computing device. The processing engines 106, 108 can provide for one or more engagements, including but not expressly limited to any immersive or complimentary processing/computing environments as recognized by one skilled in the art, including but not limited to augmented reality, virtual reality, gaming systems and platforms, online social environments and experiences, social media platforms, video games, virtual scholastic and training environments, virtual worlds, computer simulation computing environment(s), etc.

The transpose engine 110 is one or more processing devices or engines performing processing operations as noted herein in response to executable instructions. The transpose engine 110 can be a network-based, cloud-based, and/or locally-executed engine 110 performing processing operations to transpose the virtual items.

The database 112 can be one or more data storage devices having transpose rules stored therein. The database 112 can be local to the engine 110 and/or can be accessible via network communication, such as across Internet or cloud-based communications. The database 112 provides for transpose rules executed by the transpose engine 110 to transpose the virtual content items between environments created by the engines 106, 108, by way of example.

In the system 100, the user 102 engages the first environment processing engine 106. This engagement may be via any suitable means, including for example wired or wireless connectivity and local or network-based communication protocols. For example, if the first environment processing engine 106 is an online, server-based, game, a web browser or other local application may run on the computing device 104. In this embodiment, the user 102 plays the game on the computing device 104 by engaging the engine 106.

In the present method and system, the user 102 may therein transpose a virtual content item within the first environment to a second environment running on the second environment processing engine. The transpose request can originate from the second environment processing engine, the first environment processing engine, or an external computing device or engine. In one example, the second environment may also be an online, server-based game. The user 102 can engage the second environment via the same processing device 104, for example launching a separate application or launching the application via a hosting or gaming service, for example via a gaming platform such as a Steam® or any other suitable electronic platform.

Herein, the transpose engine 110 performs processing operations to transpose one or more virtual items from the first engine 106 for use in the second engine 108. As noted above, virtual items do not directly translate between engines for a variety of reasons including engine processing requirements, gameplay or environment constraints, thematic restrictions, developer restrictions, among others.

The transpose engine 110, in response to executable instructions stored in one or more non-transitory computer readable media, accesses the transpose rules of the database 112 to transpose content items. Where transposing the content item can be finding an appropriate/matching second environment item, creating a new item in the second environment by modifying an existing item from the second environment to match characteristics of the first item, and/or creating a new item in the second environment, different transpose rules can provide for different transposing operations.

Using the transpose rules, the engine 110 therein analyzes meta data or other data associated with the first item. Based on this analysis, the engine 110 can then assess the specifics of the first item. The engine 110 additionally determines or otherwise processes or reviews data associated with the first and/or second computing environment to assess the specifics of the second computing environment into which the item is being transposed.

Having knowledge of the specifics of the first item and specifics of the computing environments, the engine 110 computationally generates or determines one or more appropriate second items, where the second item is a translation of the first item usable in the second environment. In one embodiment, the engine 110 performs this operation based solely on the environment data relating to the second computing environment. In one embodiment, the engine performs this operation based on using the environment data for the first computing environment and the second computing environment.

In the first embodiment of finding the second item that correlates to the first item, the transpose rules can be correlation matching instructions. By way of example, the transpose rules can match specific environments to determine if a thematic match is pursuable. If the environments correlate with enough degree, the rules can then address the first item, including correlating meta data associated with the first item. For example, if the first item is a long-sword for a medieval world-building game, one correlation can be other suitable swords for correlated worlds such as a samurai sword for a Japanese feudal environment.

In the second embodiment of the modifying an existing item in the second environment, the transpose rules can be item recognition and modification rules. By way of example, the transpose rules can determine the first and second environments do not necessarily correlate, requiring some modification of an existing item in the second environment. For example, if the first environment is a medieval world-building game and the first item is a longbow, the second environment may be an alien-environment space-based shooting game. The longbow may not directly correlate to the second environment, but transpose rules can modify the item. For example, another long range projectile weapon can be identified, such as a shard rifle, which can server as the template to modify and create a new weapon. Modification can include transpose rules associated with the second environment operational features, for example understanding ammunition options, gravity or other environmental specifics, enemy weapons, etc.

In this second embodiment, an item can then be modified based on the transpose rules to match the essence or feel of the first item in the second environment. In the above example of a longbow, this item could be modified to being a long-range hypersonic shard shooting device.

In the third embodiment of creating the second item, the transpose rules can include operations similar to the first and second embodiment to determine a new item is to be created. Where a new second item is created, the transpose rules can operate similar to the second embodiment, whereby instead of modifying an item in the second environment, the rules provide for creating a new item. For example, the first environment may be a first-person vehicle racing game and the second environment may be a medieval world-building game. A supped-up motorcycle from the first environment does not thematically belong in the second environment. The transpose rules may also not seek to modify the motorcycle, for example the general concept of motorized vehicles still are outside the theme of the second environment. Therefore, in this embodiment, the transpose rules can include creating a completely unique second item, such as a riding horse. In one embodiment, the transpose rules may integrate visual cues, such as adding stickers and logos originally found on the motorcycle on the saddle of the horse. Where here, the second item is a completely new item and not a modification of the first item.

The engine 110, upon determining the second item, provides for authorizing use of the second item in the second computing environment.

Varying embodiments as described herein provide for implementation using standard processing logic and can further include Intelligent Transposition or Intelligent Asset Evaluation processing functions for refining data sets and processing operations. In one embodiment, one or more AI engines can perform learning operations to build the database 112. As noted above, the database 112 is a rules database providing rules used by the transpose engine 110.

For example, the intelligent transposition processing operations and the intelligent asset evaluation processing operations can be performed using one or more processing servers. For example, one embodiment may include using server 150 of FIG. 2, or additional networked or local processing devices not expressly illustrated but providing for network-based communication with the server 150. In further embodiments, the processing operations may be performed or integrated with the engine 302 of FIG. 6 described in greater detail below.

One embodiment includes one or more AI engines using Intelligent Transposition or Intelligent Asset Evaluation processing operations to refine the rules of the database 112. For example, one embodiment can include an AI engine using existing videogame and gameplay content as learning models. For example, an engine can review gameplay video content such as livestreamed and online content of gameplay using machine vision or other functional operations to detect not only gameplay items, but also detect and processing functional features and usage.

For example, this could include learning from a wide variety of media (film, books, plays, digital art, physical art, etc.). It could include learning from social media for all types of available data such as but not limited to fashion trends, social trends, slang, etc., historical books, movies and documentaries to learn about time period and setting, YouTube® documentaries to learn about culture and empire specific forms of transportation, etc. In another example, Intelligent Asset Evaluation could determine that an item that shoots out flames would deliver heat based damage. In another example, Intelligent Asset Evaluation could identify various forms of architecture set in a particular geography, or time period, and contribute this to training data for Intelligent Transposition when generating an item for a new environment. These examples are general in nature and not limiting, whereby the Intelligent Asset Evaluation utilizes processing operations for identifying data, learning data, or otherwise generating data points usable for transposition operations as noted herein.

The present method and system can include building the database 112 with improved rules and/or building the database with predetermined transport items. For example, where the above embodiment of FIG. 1 uses the transpose engine to perform a dynamic translation of the virtual item between environments, another embodiment can use the transpose engine 110 or a similar functional processing element to create a pre-existing or prepopulated database of transpose items anticipating varying environment data variances for different worlds.

For example, in some embodiments a predetermined or consistent transposition may be preferred or required between known or predetermined environments. By way of example, the first and second computing environments are very popular and often played games and it is a common or repeated occurrence to transpose one or more items, one embodiment of the present invention can include using a database of predefined or predetermined transpositions, where the Intelligent Transposition can be performed a first time, the transposed second item stored as a data point, e.g. a name or description of the item such that future transpose requests access the data point instead of dynamically using the processing resources for performing a new Intelligent Transposition.

For example, the Brightmount Steed from World of Warcraft® could be predetermined or preset to always become a CyberCycle in Call of Duty®. The inclusion of a pre-existing data set of transposes or recording conducted transposes can be used in a variety of manners. One embodiment can include if a computing environment designer or developer wishes to place restrictions on what can be transposed into the environment. In another embodiment, this can be utilized if there are ultra-rare or limited items, for example unique loot-box embodiments found in the computing environment, where pre-existing transpose rules or pre-existing transpose operations can address the uniqueness or rarity of the item.

In this pre-populated data set embodiment, the Intelligent Transposition or Intelligent Asset Evaluation can improve the training data and rules based on the learning operations and then create repositories of transpose items as options for future transpose requests. The operation of Intelligent Transposition therefore allows for prepopulating data sets, such as data set 112. Therein, the operation of electronically determining a second item for the second environment can be a look-up function to access the repository instead of the dynamic translation operation.

Figure 2:
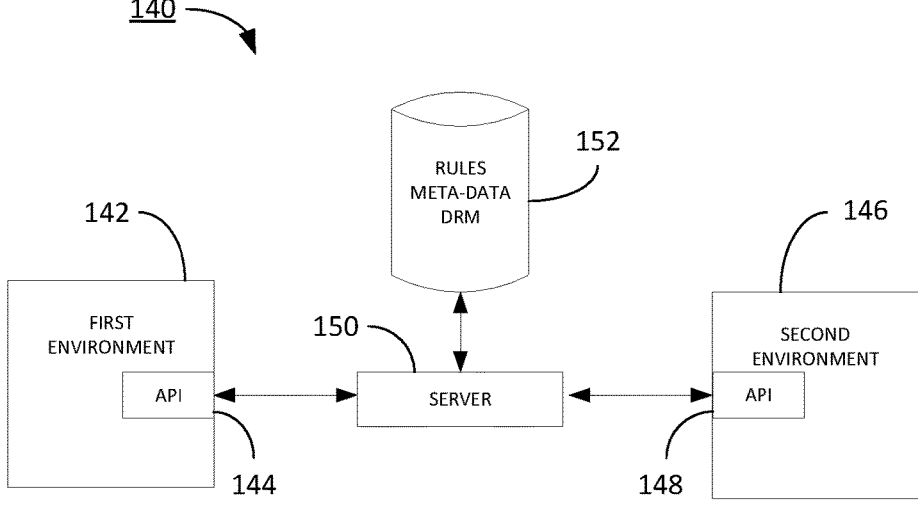
FIG. 2 illustrates another embodiment of a computing environment providing for transposing virtual content items.

FIG. 2 illustrates another embodiment of a computing system providing for transposing virtual content items. The system 140 includes a first environment 142 having an application programming interface (API) 144 therein, as well as a second environment 146 with an API 148 therein. Disposed therebetween, a server 150 engages a rules database 152.

In this embodiment, the server 150 may perform transpose engine 110 operations, the rules database 152 similar to the database 112 of FIG. 1. The APIs 144 and 148 can directly communicate with the server 150. Transposing a virtual content item from the first environment 142 includes transmitting the content item data or a transpose instruction to the server 150 and transmitting instructions to the second environment 146 for authorizing use of the second (transposed) content item.

The rules database 152 can include any number of rules or conditions usable for transposing virtual content items. The database 152 can include rules relating to the specific environments, meta-data associated with the environments or content items, meta-data translation or interpretation rules, digital rights management rules, among other rules.

The systems 100 and 140 of FIGS. 1 and 2 can operate to perform the computerized method for transposing virtual content as noted in FIG. 3. FIG. 3 illustrates one embodiment of a computerized method for transposing virtual content items between computing environments.

Step 200 is receiving a transpose request to transpose a first item from a first computing environment to a second computing environment. For example, the first computing environment can be processing environment 142 of FIG. 2 and the second computing environment can be processing environment 146 of FIG. 2. In another example, the first computing environment may be a futuristic team-based military-style videogame and the second computing environment may be a middle-ages clan-based world building game.

The transpose request may be a data command requesting to make the first item available in the second computing environment. The first item can be any suitable in-game content item. In this example, a content item may be a high-powered gun that shoots laser bullets in the first computing environment.

The transpose request can come from any number of suitable sources. For example, in one embodiment the transpose request can originate from the user active within the first environment processing engine 106, e.g. the user seeking to export a content item. For example, in one embodiment the transpose request can originate from for the user active within the second environment processing engine 108, e.g. the user seeking to import a content item. For example, in one embodiment the transpose request can originate external to the processing engines 106 and/or 108, such as an external software application seeking to transpose items between environments, e.g. a user has a locker, electronic wallet, or other electronic database of items or authorizations for items that are capable of being transported.

The transpose request includes first item data relating to the first item. In this example, the first item data can be meta data describing features of the first item and may also include meta data describing the first processing environment, referred herein as environment data relating to the first computing environment.

FIG. 4 illustrates one exemplary embodiment of meta-data associated with the first item. In this example, the meta-data is a multi-field data structure with data fields relating to the high-powered gun. The data fields can include item features, gaming era, value or scarcity within the game, skill level to use the weapon, or any other suitable data fields. In one embodiment, meta-data can include branding or other meta-data identifying the item being associated with or owned by a third-party.

In FIG. 3, step 202 is accessing environment data relating to the second computing environment. The access of the environment data can be via any suitable data access routine. For example, one embodiment may include directly accessing the second environment via the API contained therein. In another example, a separate content database may contain the environment data for the different embodiments. In another example, the environment data may be included with the data stored in the database 112 of FIG. 1.

In one embodiment, the transpose rules may also include limitations or prohibitions against transposing content items. For example, some content items may be deemed proprietary and not authorized for transposing between environments. Therefore, transpose rules can include exclusions prohibiting transposing of virtual content items. These transpose rules can be specific to content items and/or specific to computing environments. For instance, a content item may be transposed between computing environments authored by the same company, but excluded from be transposed to a third-party's computing environment.

Step 204 is accessing a plurality of transpose rules relating to transposing the first item from the first computing environment to the second computing environment. In one embodiment, the transpose rules can be a plurality of if-then conditional statements or other logic for reviewing, interpreting, transforming, or otherwise processing the first item data.

Step 206 is electronically determining a second item for utilization in the second computing environment. Here, the determination of the second item is a virtual translation of the first item to be usable in the second computing environment, based on the transpose rules and the environment data of the first and second computing environment.

As noted above, the translating the first item for the second environment can be finding a second item, where the second item is an existing item, modifying the first item to create a new second item, or to create a completely new item as the second item.

Using the above example of the first item being a laser-shooting gun and the second computing environment being a middle-ages community-building game, the second computing environment has no thematic rational to use or process the first item. Therefore, the transpose rules provide for translating the first item into the second item accounting for the second computing environment, where the second item is an item already existing in the second computing environment.

In this example, the transpose rules can then translate, modify, or generate an appropriate item. For example the gun in the first computing environment may be translated to a longbow in the second computing environment. For example, the gun in the first computing environment may be modified to a thematic-appropriate wizard's staff in the second computing environment. For example, the gun in the first computing environment may be discarded and a new item altogether is generated for the second environment.

Step 208 is transmitting an authorization command, or other type of activation or validation command, to the second computing environment so the second content item can be used in the second computing environment. In one embodiment, authorization and/or validation may be performed using a third-party or external verification source or computer processing service.

By authorizing in the second computing environment, the user can therein use the transposed version of the first item while engaging the second computing environment. In this example, the user can therein use the longbow in the middle-ages community building game because the user owns the laser bullet gun in the futuristic game.

The proposed invention provides for a system and method for performing transformations of a virtual item, or group of items, across multiple virtual environments. Because of the processing method and system, items are no longer siloed in any one environment, but are usable across multiple environments.

For further exemplary illustration, FIGS. 5A-5E illustrate varying exemplary embodiments of electronically determining second items. In each embodiment, associated data is processed by the transpose engine 110 and transport rules from the database 112.

Figure 5A:
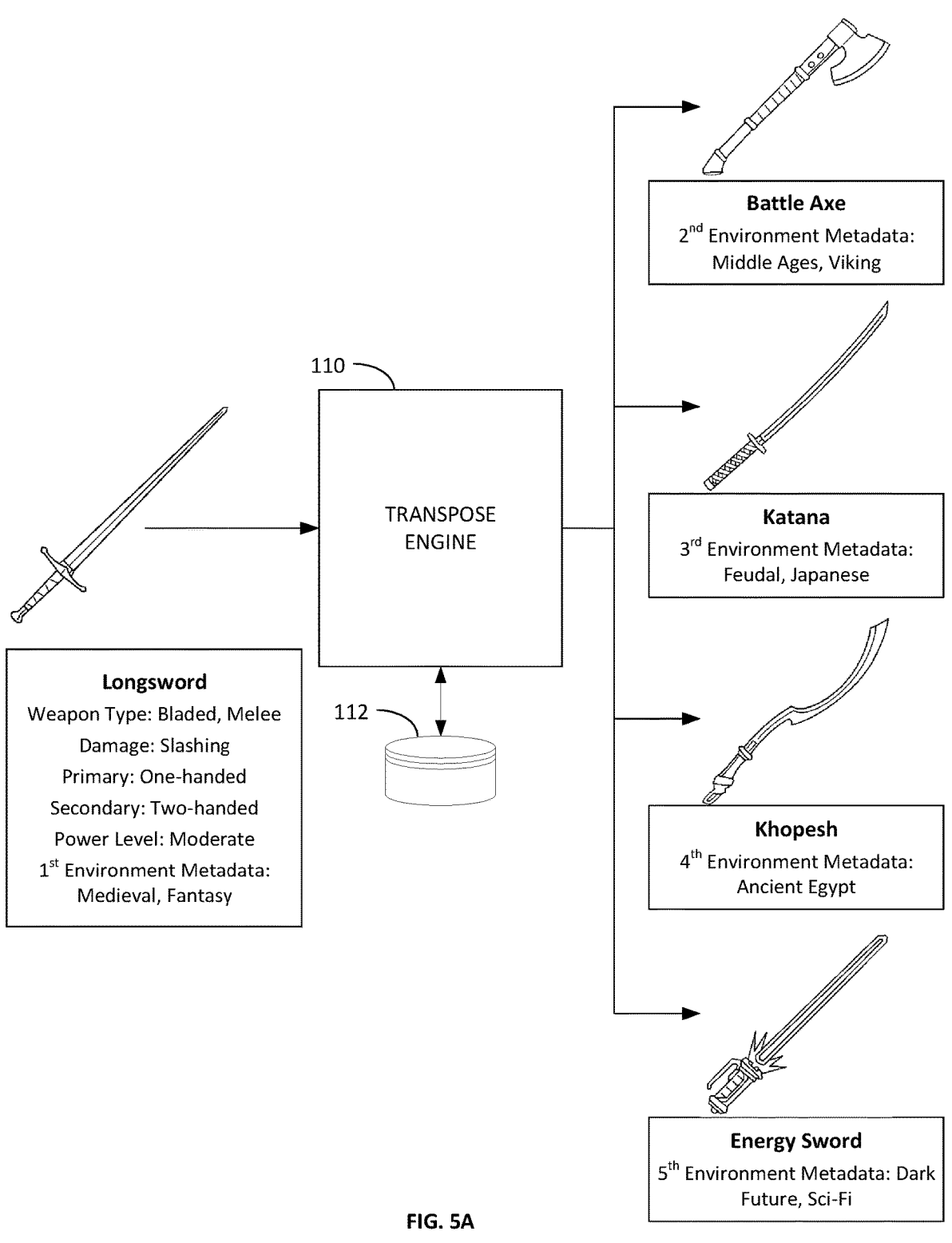
Figure 5B:
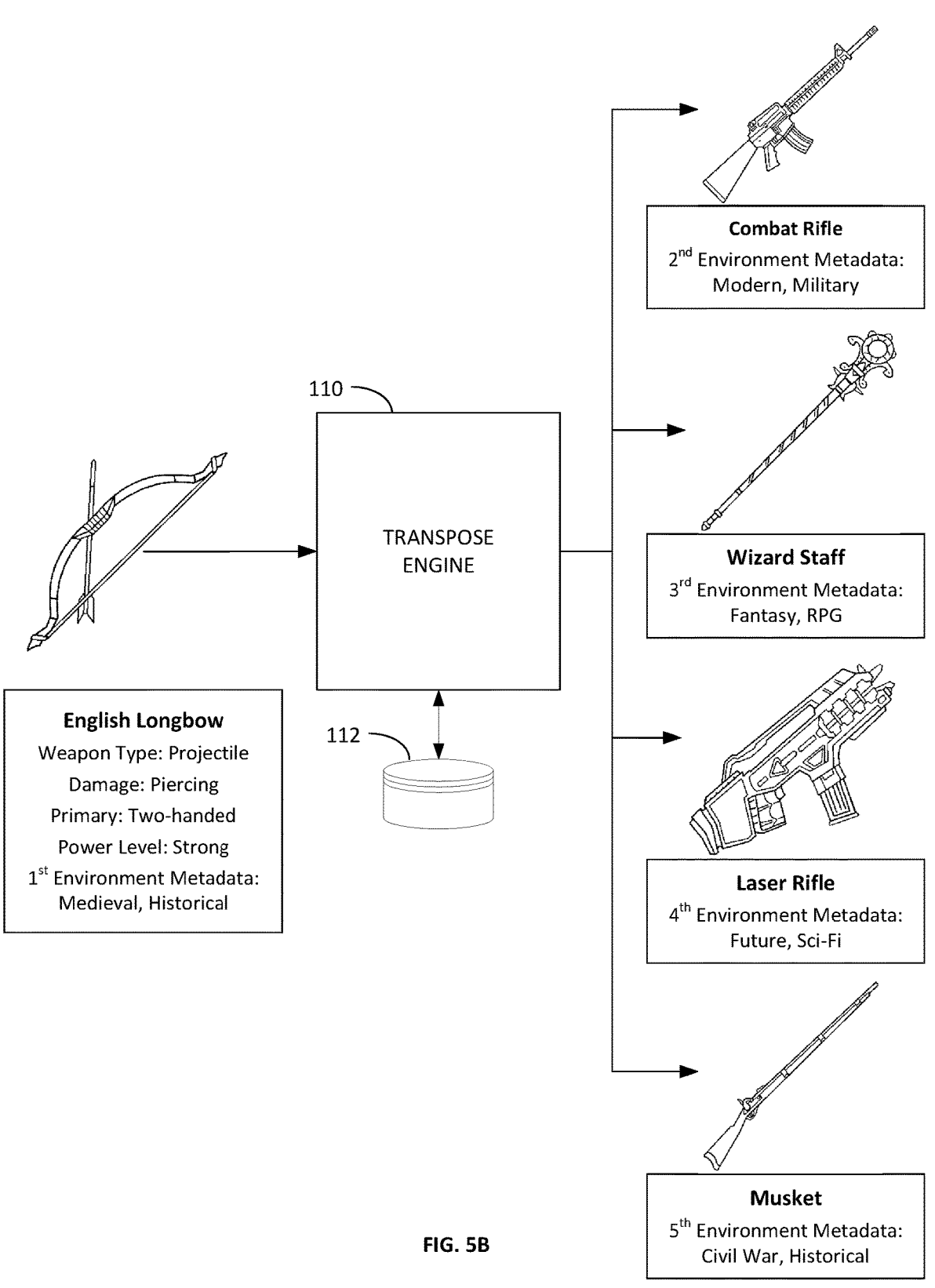

FIG. 5A illustrates the example of the first item being a longsword and the associated meta data. In the example, the meta data includes weapon type; damage; primary use; secondary use; power level, and first environment data. The transpose engine 110 can then determine transportable items for different environments, such as a battle axe for a middles ages, Viking environment; a katana for a feudal, Japanese environment; a khopesh for an ancient Egypt environment; and an energy sword for a dark future, sci-fi environment.

Figure 5C:
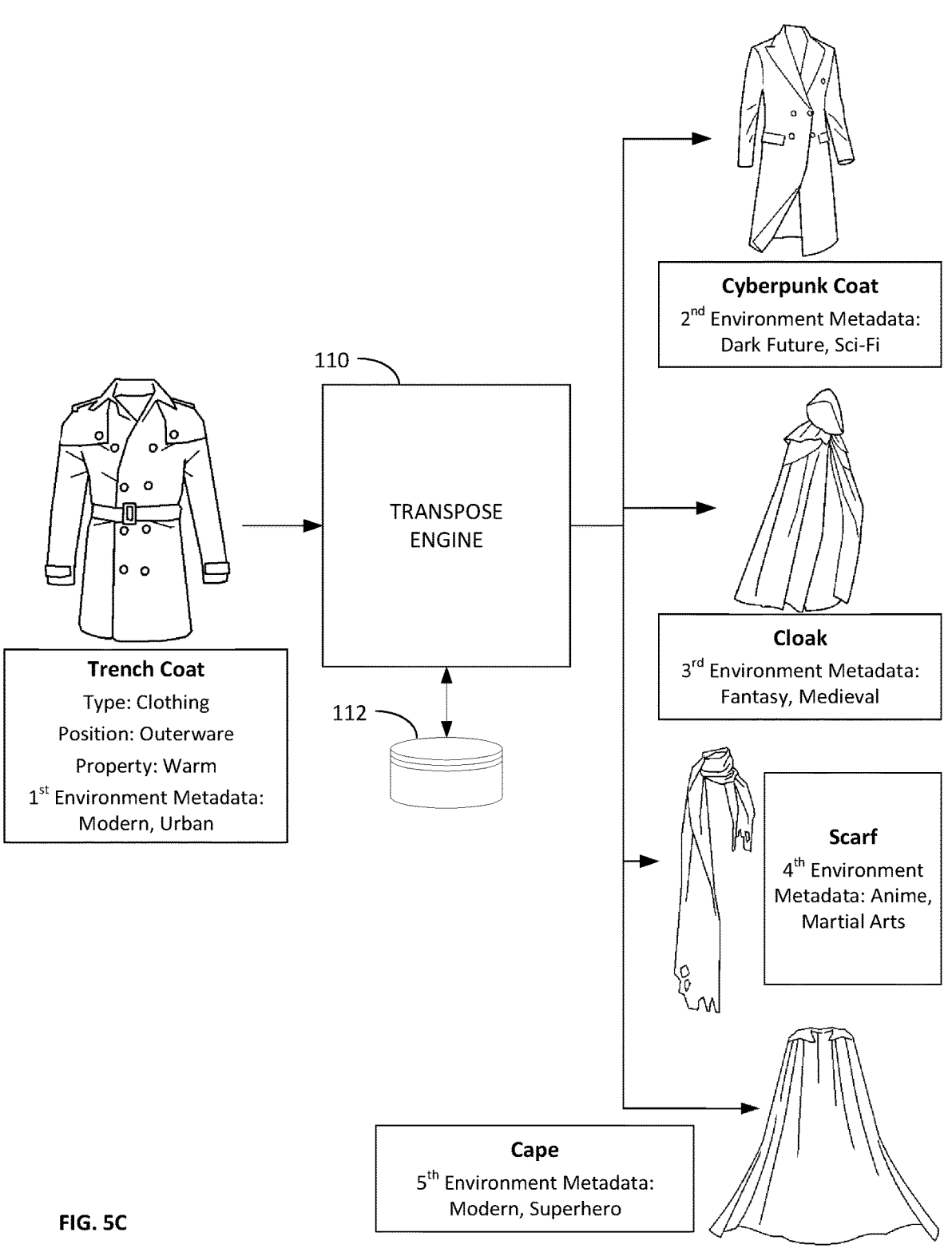
Figure 5D:
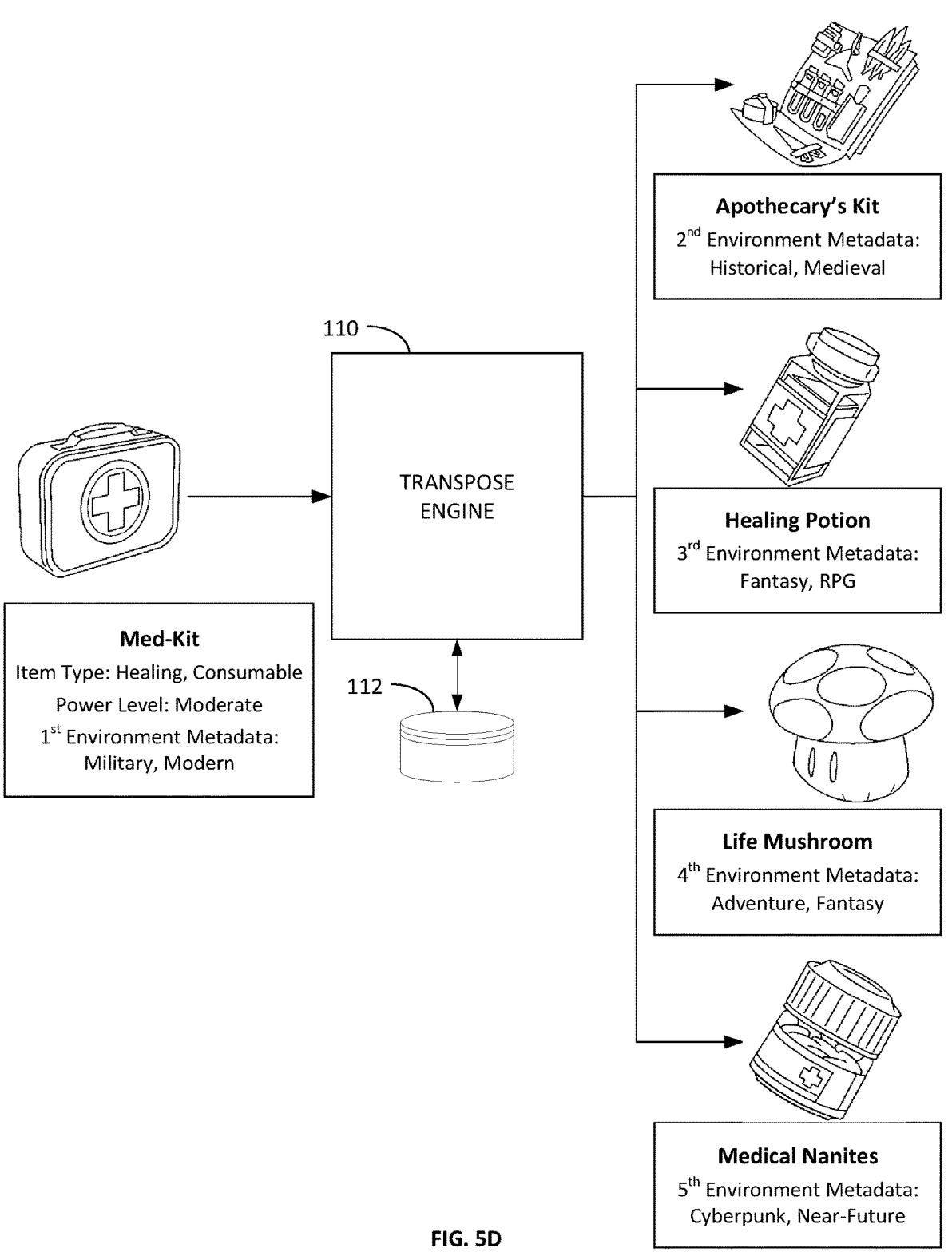

FIGS. 5B-5E illustrate further exemplary embodiments. Moreover, as noted in FIGS. 5A-5E, the items for transporting can vary and are not limited to weapons. For example, FIG. 5C is an example of clothing or decorative attire, FIG. 5D is an example of an in-game health unit, and FIG. 5E is an example of a vehicle or mode of transport. Moreover, these examples are not limiting but the item(s) for transpose can be any suitable in-game item as recognized by one skilled in the art.

Where the above embodiments include examples with transposing a first item into a second item, the method and system operates across any number of computing environments or worlds and can transpose any number of items. The transposing operation is not limited to a single element for a single world, but for example can include any number of transposed items from any number of different environments or worlds into a single world. Multiple transpose operations can be performed dynamically and concurrently for transposing virtual content.

The method and system can further utilize Intelligent Transposition for facilitating the transposing of virtual items across multiple environments. Through the use of Intelligent Transposition and associated learning models, for the embodiment(s) using the AI engine operations noted herein, the transposing of content can be performed dynamically with rules improved using AI learning or the transpose operations can be a look-up function with existing databases of transpose items predetermined using one or more item build engines.

The Intelligent Transposition can utilize the Intelligent Asset Evaluation functionality in one or more of three manners. The first embodiment is solely using pre-existing transpose rules as described above. The second embodiment is using the AI, ML, or other recursive learning operations independent of the transpose rules. The third embodiment is using the AI, ML, or other recursive learning operations either in conjunction with the rules or on the rules by improving or updating the transpose rules including using the pre-existing transpose rules as part of the learning data set(s).

Figure 6:
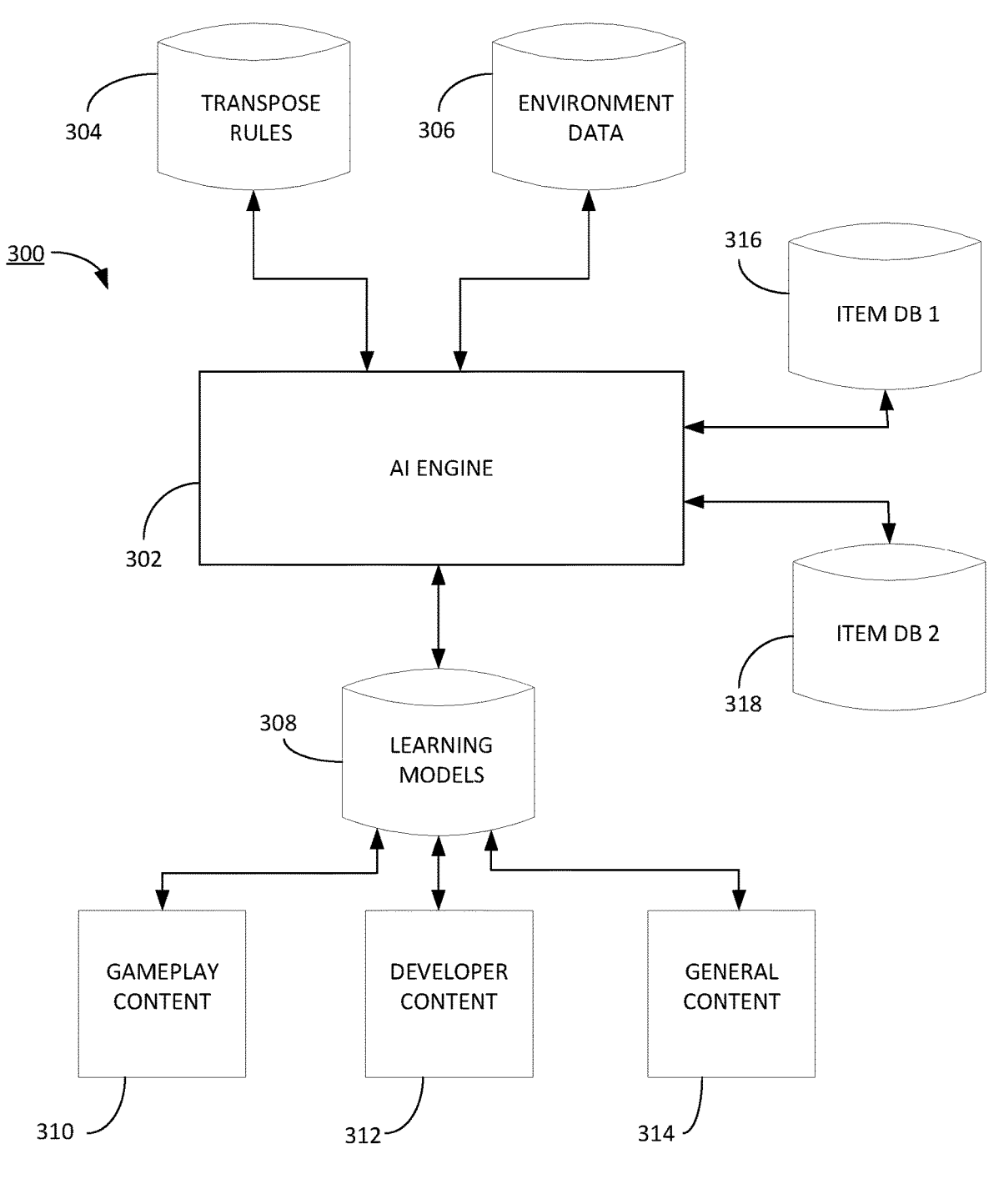
FIG. 6 illustrates one embodiment of a processing environment for intelligent transposition processing operations.

As noted above, the system of FIG. 1 can include pre-built datasets of transpose items and/or enhanced rules modified under AI learning. FIG. 6 illustrates one embodiment of an AI engine functionality associated with present method and system. The system 300 of FIG. 6 includes an AI engine 302 which may be any suitable type of engine, including but not limited to a generative AI engine, including performing processing operations for the intelligent transposition and/or intelligent asset evaluation operations as noted herein The engine 302 communicates with and provides feedback via learning operations to both transpose rules 304 and environment data 306. In one embodiment, the transpose rules 304 and the environment data 306 can be similar to the rules and data as described above. The data sets 304 and 306 can be pre-loaded and updated based on the engine 302 operations.

In this exemplary embodiment, the engine 302 operates using learning models 308. The learning models 308 can use any suitable learning datasets as recognized by a skilled artisan. Illustrated herein are three exemplary data sets and this is not a limiting list of data sets. The data sets, can be, in one embodiment, used for generating the transpose rules. In further embodiments the data sets used by the learning models can be at least a part of the learning data used for AI, ML, or other recursive operations as part of the Intelligent Transposition and Intelligent Asset Evaluation.

The first data set is gameplay content 310, which can be any suitable gaming content. For example, this can include livestream content as well recorded or otherwise distributed content. Examples can include streaming content available via Twitch®, YouTube®, Medal.tv®, social media platforms such as TikTok®, Facebook®, Instagram®, or any other suitable platforms. Learning models may utilize data and/or video scrapping operations to view and collect all types of data, including gaming data and non-gaming data, including game content elements, usage, environmental data, among other types of data such as general knowledge or other information ancillary and/or complimentary the gaming data.

A second data set can be information provided by developers, including but not limited to developer content 312. This generally may include general data available from videogame or other content developers. For example, developers may include software hubs for user generated content. For example, developers may include Wiki pages or other fan-base pages including esoteric details or data about a game or environment. In another embodiment, developers may be able to upload or otherwise include developer-generated meta data or other identifier data associated with the generated content. In general, this data set is distinguished as input or other learning data provided from content generators, including but not limited to developers or content generators generating content found within the computing environments.

A third data set is general content 314. Where many games and content items are based on eras, themes, realities, and other environmental factors, general content 314 can include generally available or specialist knowledge. By way of example, general data can include information about motor vehicles, vehicle and part manufacturers, geographic information about race tracks, among other information applicable for a racing game environment. By way of example, general data can include information about Japanese art, history, language, weaponry, customs, and other information for a video game taking place in a feudal Japanese world.

The AI engine 302 operates in response to the learning models 308 to learn and refine the rules 304 and environmental data 306, as well as other applicable information. The AI engine 302, in one embodiment, can pre-populate or store predetermined transposed items in the item databases 316 and 318 with transposed virtual items. Where embodiments in FIG. 1 includes dynamically generating transpose items, one embodiment can include a look-up table or other reference for acquiring pre-generated transpose items.

In this embodiment, the AI engine 302 can continually generate new transpose items based on the iterations of transpose rules, virtual items, and environment data. The resultant storage of transposed items can be accessed using look-up references based on the processing data sets including first item, the first computing environment, and the resulting second computing environment.

On noted above, varying embodiments can utilize the AI, ML or other recursive computing operations in a number of different techniques. The learning functions can be part of the Intelligent Transposition and/or part of the Intelligent Asset Evaluation. Moreover, the learning functions can also iterate to update transpose rules, further refining the ability to transpose items between computing environments based on improved data analysis and learned data models.

The AI, ML, or other recursive computing operations can utilize any suitable processing technique(s) as recognized by a skilled artisan. The computing operations can be built on large language model processing, including assessment and learning when acquiring and processing text-based data. The computing operations can be built on generative AI engine (s). In further embodiments, the generative AI can include generative adversarial networks, for example for, but not limited to, image synthesis and modification. The AI, ML, or other recursive computing operations may be performed using any additional processing and learning routines or operations as recognized by a skilled artisan.

FIG. 7 illustrates a flowchart of the steps of one embodiment of a method for transposing virtual items. This embodiment can include, but is not expressly limited to, transposing virtual through the usage of an AI engine with ML functionality.

Step 340 is receiving a transpose request to transpose a first item from a first computing environment to a second computing environment, the transpose request including first item data relating to the first item. Similar to the embodiments above, one example can be a user seeking to move one or a number of gaming items between the computing environments, the first item being one of the many items.

Step 342 provides for the Intelligent Transposition as performed by the processing and computing systems noted herein. In one embodiment, step 342 is determining a second item for utilization in the second computing environment based at least on environment data and transpose rules. Step 342 determining can be a dynamic operation of generating the second item using a transpose engine as noted above, for example FIG. 1. In another embodiment, the dynamic build can be enhanced using knowledge acquired by the AI engine. Step 342 determining can also be a look-up function for accessing one or more databases with transpose item data therein, for example in an embodiment where there is a predefined or prescribed transpose between known environments for a unique or highly-specific item.

Step 342 may include alternative embodiments as part of the Intelligent Transposition, including using data acquired via the Intelligent Asset Evaluation, as described above. Therefore, in different embodiments, the determining the second item can be based on different or additional data, including the learning data from the AI, ML or other recursive operations. Moreover, varying embodiments can use the transpose rules by themselves, the learned data from the AI, ML or other recursive operations, or a combination thereof, including updating the transpose rules based on the learned data.

Step 344 is electronically acquiring the second item for utilization in the second computing environment, the second item being a virtual translation of the first item based on the plurality of transpose rules and the environment data of the first and second computing environments.

In varying embodiments, the second item electronically acquired in step 344 can be the virtual translation, but is not expressly limited as being solely based on the plurality of transpose rules and the environment data. As noted relative to the varying embodiments of step 342, the second item can be based on varying embodiments of data sets, including learned data sets.

Step 346 is transmitting an authorization command to the second computing environment to authorize utilization of the second item in the second computing environment to therein transpose the first item from the first computing environment to the second computing environment as the second item. Therein, the method of FIG. 7 provides for transposing virtual content items, including content items built or selected based on AI engine learning operations.

In a further embodiment, any AI-built engine with transpose items can additionally be usable for game builds. For example, the databases 316, 318 can be usable for more than virtual transposing, but can provide for improving developmental times for video games or other electronic environments. For example, a developer can access the datasets using general item descriptions, receiving in response information, code, or other data to represent the second item visually, audibly, or in textual form within their existing, newly-developed, or about-to-be developed environment.

The system, via processing operations, can supply to new environments metadata sufficient to allow the new environments to select from their own library of potential virtual items an object by which to have the original item represented in the new environment, as well as inform the system of the item selected in the new environment. Therein, the method and system can attach metadata related to the new environments representation to the original items metadata in the system.

In one embodiment, the method and system can supply to new environments an independent random number generation as part of the supplied metadata to assist with the selection of the object representation in the new environment. In this embodiment, the number assists in the second item translation, but the random generation operates consistently across environments.

In another example of the primary proposed invention, where an item can be uniquely identified, a cloud-based and/or local server-client or blockchain enabled system, which may or may not be a proprietary system, could store and record each transformation in each environment to create a bundle of transformations that are attached to a single virtual item. Therefore, the server 150 of FIG. 2 or the transpose engine 110 of FIG. 1 could communicate with distributed data store system(s), the ownership and transformations properly recorded. In one embodiment, this recordation can facilitate licensing and/or digital rights management functions. For example, in embodiments where user's or processing environments charge for transposing content, the record is usable for not only tracking the transactions, but a verifiable record for financial transactions associated therewith.

Concurrent with digital rights management, further embodiments may include financial transactions associated with the transposed content. For example, royalty payments may be required for transposing content. In another embodiment, a user may loan or rent content to another user, therefore including use fees or royalty payments for using proprietary content. The transpose engine 110 can further track this ownership information, including validating ownership prior to transmitting the authorization command.

In another example of the primary proposed invention, the system generates a unique global identifier for the object that persists independently of each other unique identifier used within each environment in which the object has been processed. Here, the method and system enables persistence across environments through an externally managed global identifier system, including managing the metadata of each representation of the item (and any sub-items bundled to it) with each game representation.

For example, in environment A, the system may identify the object as S00001 and environment A may identify the object as A98765. In environment B, the system would still identify the object as S00001, and environment B may identify the object as B88742. In environment C, the system still identifies the object as S00001, and environment C may identify the object as C5432, which includes bundled sub-items C0054 and C0085.

In one embodiment, the original item may represent a collection of individual items (a "bundle"), each of which being able to be processed interpedently by the proposed system and method. For example, the first content item may not directly translate into a single second content item. Rather, the first content item may be translated into multiple items based on the second environment. Therefore, nothing herein expressly restricts the item transformation as being a direct one-to-one, rather the number of items in each environment can vary based on the specifics of the underlying environment.

In another example of the primary proposed invention, the item could be bundled with other items to create unique visual representations. By way of example, one item may include hat(s), shirt(s), pant(s), boots, etc., where a different item can be a "skin." In this example, the translating of the bundled items from the first environment can be modified to create a skin for the second environment.

In another example of the primary proposed invention, items and environments can utilize a hierarchy of data elements to allow for multiple levels of abstraction in determining the most appropriate match for a proposed transformation.

In this embodiment, the system enables interoperability without removing individual design considerations implemented by the operator of each environment. In this embodiment, the system provides the information necessary for each environment to select a closest match representation using any suitable logic processing means. Here, the environment can then report the final selection back to the system for recording.

For example, the operator in environment A may allow for the virtual object to have 12 bullets, a range of 100 yards, realistic physics and configurable scopes and recoil options. In environment B, the object may have unlimited bullets based on energy availability, a range of 100,000 miles, no physic constraints, and no scope configurations. In environment C, the object may have 1 bullet, a range of 25 yards, realistic physics, and configurable bow and string options.

In another example of the primary proposed invention, system and method could supply metadata related to the art style, temporal period, culture, etc. of the object to enable representation in new environments. In this embodiment, the meta data is usable as part of the transformation performed by the transpose engine 110 of FIG. 1.

In another example of the primary proposed invention, an item may reference a collection of external assets used in the visual representation of the item that can then be resupplied to future environments in addition to the metadata.

In another example of the primary proposed invention, the system and method can receive updates from any of the attached environments related to changes to the item including, but not limited to, improvements, deteriorations, visual modifications, consumption, or destruction.

In another example of the primary proposed invention, each object exists agnostic of the current owner of the object.

In another example of the primary proposed invention, each object exists with the necessary information to identify the real-world owner of the object.

In another example of the primary proposed invention, while the item may be uniquely identified in the proposed system, the representation in any given environment may be either unique, or not, as determined by the environment when the item is processed by the new environment.

In another example of the primary proposed invention, the system would support the input and output of data for both the exporting group and the importing group to be able to supply the metadata associated with their own item systems to the proposed system.

In another example of the primary proposed invention, the system would support permissions that define the extent to which items can be transformed in any given environment.

In another example of the primary proposed invention, the system can supply metadata of an item intended for display to an end user in multiple languages.

In another example of the primary proposed invention, the system can supply a set of alternative terms to display to a consumer in relation to items.

The proposed system and method has a number of new inventive aspects, including an object can have an appropriate representation in each environment. For example: An original item generated in Environment A (based in modern times with humanoid avatars) as a "rifle" could have metadata of: "projectile weapon, long range, limited ammunition, modern era, offensive".

When this item is presented to a new Environment B (based in the future and utilizing space ships), the proposed system would supply the metadata of: "projectile weapon, long range, limited ammunition, modern era, offensive" and Environment B may generate a representation of that item as a "laser rifle".

Similarly in Environment C (based in the middle ages), the same item may be represented as a "longbow".

For example: An original item generated in Environment A (based in modern times) as a "longcoat" could have metadata of: "outerwear, full body, stylish, dark blue, modern era." When this item is presented to a new Environment B (based in the future and utilizing super hero tropes), the proposed system would supply the metadata of: "outerwear, full body, stylish, dark blue, modern era" and Environment B may generate a representation of that item as a "cape." Similarly in environment C (with a medieval fantasy theme), the same item may be represented as a "hooded cloak."

For example (no abstraction required matching): An original item generated in Environment A (based in modern times with humanoid avatars) as "boots" could have metadata of: "footwear, boots, utility, black, modern era." When this item is presented to a new Environment B (medieval fantasy), the proposed system would supply metadata of "footwear, boots, utility, black, modern era" and Environment B may generate a representation of that item as "boot"—since this environment also has that direct corresponding concept of a similar item.

For example (abstraction required matching): An original item generated in Environment A (based in Egyptian mythology) as "Scimitar" could have metadata of: "melee weapon, bladed, Egyptian, utility, offensive." When this item is presented to a new Environment B (Japanese Shogun era), the proposed system would supply metadata of "melee weapon, bladed, Egyptian, utility, offensive" and Environment B may generate a representation of that item as "Katana"—as this environment has no direct corresponding concept of a similar item, it works its way up the hierarchy from "Scimitar" (no match) to "One-handed bladed sword" and sees that Environment B has a matching entry for "Katana."

When this item is presented to a new Environment C (Social chat construct), the proposed system would supply metadata of "melee weapon, bladed, Egyptian, utility, offensive" and Environment C may generate a representation of that item as an "Axe"—as this environment has no direct corresponding concept of a similar item, it works its way up the hierarchy from "Scimitar" (no match) to "One-handed bladed sword" (no match) to "One-handed bladed weapon" and sees that Environment C has a matching entry for "Axe."

The system supports the definition of downstream revenue generation for item originators and/or IP rights holders at the time of transformation.

For example: an item is generated in Environment A that contains the metadata of IP License=True and License Holder=Warcraft and Transform Cost=$1.00. Any time this item is then attempted to be transformed in another environment, that environment would need to pay the License Holder $1.00. The present method and system, in one embodiment, supports the collection of these fees as part of an authorized transformation call to the system, either directly or via one or more third-party fee collection services, computerized platforms, or software modules.

The system can supply a set of alternative terms to display to a consumer in relation to items. For example: an item with the metadata of "Footwear: Boot" is submitted to the system for a transformation request. The system returns the additional metadata: "Alternates: Greaves, Shoe, Sandal, Thong, etc."

In one embodiment, the transposing of the first item to a second item can be performed based solely on the second environment data. In embodiments where the first environment data is not available, unreadable, or otherwise not usable by the transpose engine, the engine can generate the second item based the available first item meta data and the second environment data. In another embodiment, if the first item meta data is not available from the first environment, this meta data can be user-generated data, crowd-sourced data, image or reference look-up data, by way of example.

In further embodiments, the transpose request does not have to originate from the second environment. In varying embodiments, the transpose request can originate from a third-party source or other engine accessing or requesting second environment data.

Additionally, the present method and system can operate with multiple item transpose operations in concurrent execution. The environment receiving the transposed item may received transposed items from multiple environments. For example, a user may transpose weapons from multiple different environments, such as building up an arsenal or armory in the second environment.

For example, the user may outfit a second environment character with multiple items, weapons, inventory items, etc., from different environments. In this example, the user may transpose these items in the second environment, including a first weapon from a first environment, a second weapon from third environment, an inventory item from a fourth environment, clothing from a fifth environment, and a mode of transportation from a sixth environment.

In further embodiments, the user may transport multiple items from the same environment. For example, the user may outfit the second environment character with two different weapons and a transportation mode from the first environment. In this example, the user may import clothing from a third environment, and so on.

The transpose request further allows the user to create a new persona or defined character. In this embodiment, the second environment character is associated with the one or more transposed items, such as a functional grouping operation. The user may transpose the persona or character to a new game or environment, thereby re-iterating the above-disclosed transpose operations for each of the individual operations. Whereby the present method and system can transpose an individual item, as we transposing multiple items by performing the transpose operations as to each individual item.

FIGS. 1 through 7 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A computerized method for transposing virtual content items between computing environments, the computerized method comprising:

receiving a transpose request to transpose a first item from a first computing environment to a second computing environment, the transpose request including first item data relating to the first item within the first computing environment;

based on a plurality of transpose rules relating to transposing the first item from the first computing environment to the second computing environment and environment data relating to both the first computing environment and the second computing environment, executing an intelligent transposition to determine a second item for utilization in the second computing environment, wherein the intelligent transposition includes processing operations as performed by at least one artificial intelligence processing engine including analyzing the environment data relating to the both the first computing environment and the second computing environment and the plurality of transpose rules and generating the second item based at least thereon and wherein the intelligent transposition includes updating the at least one artificial intelligence processing engine based on the generating of the second item;

electronically acquiring the second item for utilization in the second computing environment, the second item being a virtual translation of the first item based on the intelligent transposition as generated based at least on the at least one artificial intelligence processing engine; and transmitting an authorization command to the second computing environment to authorize utilization of the second item in the second computing environment therein transposing the first item from the first computing environment into the second computing environment as the second item.

2. The method of claim 1, wherein the electronically acquiring the second item includes accessing at least one database having the plurality of virtual content items disposed therein.

3. The method of claim 1, wherein the at least one artificial intelligence engine generates the virtual content items based on processing operations including intelligent asset evaluation operations, wherein the intelligent asset evaluation operations include processing of third party data external to the first computing environment and the second computing environment usable for supplementing the intelligent transposition.

4. The computerized method of claim 3, wherein the processing of third party data includes processing of at least one of: literature, audio content, video content, and prior gameplay content independent of the transpose request in the first computing environment.

5. The computerized method of claim 1, wherein the first computing environment is at least one of: a video game computing environment, a virtual world computing environment, an augmented reality computing environment, a social network computing environment, a business computing environment, an educational computing environment, and a computer simulation computing environment.

6. The computerized method of claim 1, wherein the computerized method is performed at a server-based processing system separate from the first computing environment and the second computing environment via at least one networked communication pathway.

7. The computerized method of claim 1, wherein the transpose request from the first computing environment is generated using a first application programming interface disposed therein.

8. The computerized method of claim 7, wherein the authorization command is transmitted to a second application programming interface disposed in the second computing environment.

9. The computerized method of claim 1 further comprising:
   receiving a transpose validation command prior to transmitting the authorization command to the second computing environment.

10. The computerized method of claim 1 further comprising:
   determining digital rights associated with the first item within the first computing environment; and
   tracking the digital rights managements for the first item relative to the second item.

11. The computerized method of claim 10, wherein tracking the digital rights managements includes tracking at least one royalty payment for utilization of the second item in the second computing environment.

12. The computerized method of claim 10, wherein tracking the digital rights includes:
   validating ownership of the first item in the first computing system prior to transmitting the authorization command to the second computing environment.

13. The computerized method of claim 1, wherein the virtual translation of the first item includes at least one of:

finding the second item that correlates to the first item, modifying the first item to generate the second item, and creating the second item.

14. The computerized method of claim 1, wherein the transpose rules includes rules relating to at least one of: computing environment artistic features, computing environment style, computing environment world, and computing environment era.

15. A system for transposing virtual content items between computing environments, the system comprising:
   at least one memory device having executable instructions stored therein; and
   a processing device, in response to the executable instructions, operative to:
   receive a transpose request to transpose a first item from a first computing environment to a second computing environment, the transpose request including first item data relating to the first item within the first computing environment;
   based on a plurality of the transpose rules relating to transposing the first item from the first computing environment to the second computing environment and environment data relating to the first computing environment and the second computing environment, executing an intelligent transposition processing operation to determine a second item for utilization in the second computing environment, wherein the intelligent transposition includes processing operations as performed by at least one artificial intelligence processing engine including analyzing the environment data relating to the both the first computing environment and the second computing environment and the plurality of transpose rules and generating the second item based at least thereon and wherein the intelligent transposition includes updating the at least one artificial intelligence processing engine based on the generating of the second item;
   electronically acquire the second item for utilization in the second computing environment as generated based at least on the at least one artificial intelligence processing engine, the second item being a virtual translation of the first item based on the plurality of transpose rules and the environment data of the first computing environment and the second computing environment; and
   transmit an authorization command to the second computing environment to authorize utilization of the second item in the second computing environment to therein transpose the first item from the first computing environment into the second computing environment as the second item.

16. The system of claim 15, wherein the electronically acquiring the second item includes accessing at least one database having the plurality of virtual content items disposed therein.

17. The system of claim 15, wherein at least one artificial intelligence engine generates the virtual content items based on processing operations including intelligent asset evaluation operations, wherein the intelligent asset evaluation operations include processing of third party data external to the first computing environment and the second computing environment usable for supplementing the intelligent transposition.

18. The system of claim 17, wherein the processing of third party data includes processing of at least one of: literature, audio content, video content, and prior gameplay content independent of the transpose request in the first computing environment.

19. The system of claim 15, wherein the processing device is disposed within a server-based processing system in communication with the first computing environment and the second computing environment via at least one communication network.

20. The system of claim 15, the processing device in response to the executable instructions, further operative to:

determine digital rights associated with the first item within the computing environment; and track digital rights managements for the first item relative to the second item.

\*  \*  \*  \*  \*